United States Patent [19]
Lorenzen et al.

[11] Patent Number: 5,847,360
[45] Date of Patent: Dec. 8, 1998

[54] ELECTRIC STEERING-WHEEL HEATING ELEMENT

[75] Inventors: Günter Lorenzen, Olching; Michael Weiss, Benediktbeuern, both of Germany

[73] Assignee: Wärme-und Elektrotechnik B. Ruthenberg GmbH, Germany

[21] Appl. No.: 760,598

[22] Filed: Dec. 4, 1996

[30] Foreign Application Priority Data

Dec. 5, 1995 [DE] Germany .......................... 195 45 353.0
Mar. 21, 1996 [DE] Germany .......................... 196 11 231.1

[51] Int. Cl.⁶ ................................ B60L 1/02; H05B 3/50
[52] U.S. Cl. ........................ 219/204; 219/535; 219/544; 219/546; 219/552
[58] Field of Search ..................................... 219/204, 528, 219/203, 211, 545; 156/308; 29/611; 74/558, 552; 359/273; 174/35; 206/328; 428/246

[56] References Cited

U.S. PATENT DOCUMENTS 5,294,775   3/1994   Carrier .

FOREIGN PATENT DOCUMENTS

| | | |
|---|---|---|
| 0437641A1 | 7/1991 | European Pat. Off. . |
| 3339500C2 | 5/1984 | Germany . |
| 8612133.2 | 9/1986 | Germany . |
| 8705717.4 | 10/1987 | Germany . |
| 3643398A1 | 6/1988 | Germany . |
| 3906576C1 | 6/1990 | Germany . |
| 9318355.0 | 2/1994 | Germany . |

Primary Examiner—Teresa J. Walberg
Assistant Examiner—Vinod D. Patel
Attorney, Agent, or Firm—Rothwell, Figg, Ernst & Kurz, p.c.

[57] ABSTRACT

The electric steering-wheel heating element to be mounted on a steering wheel rim has a linear center region made of flat ribbon-shaped, electrically conductive material. A first side region and a second side region made of flat ribbon-shaped, electrically conductive material each have at least one curved side segment and. The shape of the center region and of the curved side segments is configured such that, after mounting, the center region covers an external circumferential region of the steering wheel rim, the first side region alongside a longitudinal side of the center region covers a side circumferential region on one side of the steering wheel rim and the second side region alongside the other longitudinal side of the center region covers a side circumferential region on the other side of the steering wheel rim.

7 Claims, 3 Drawing Sheets

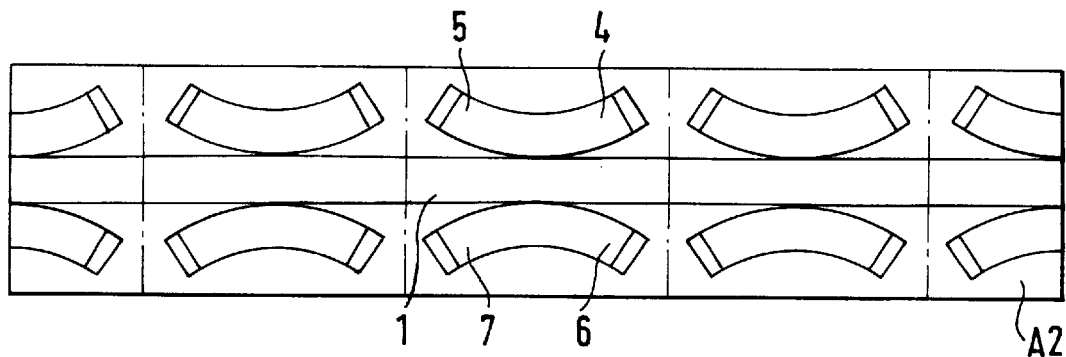
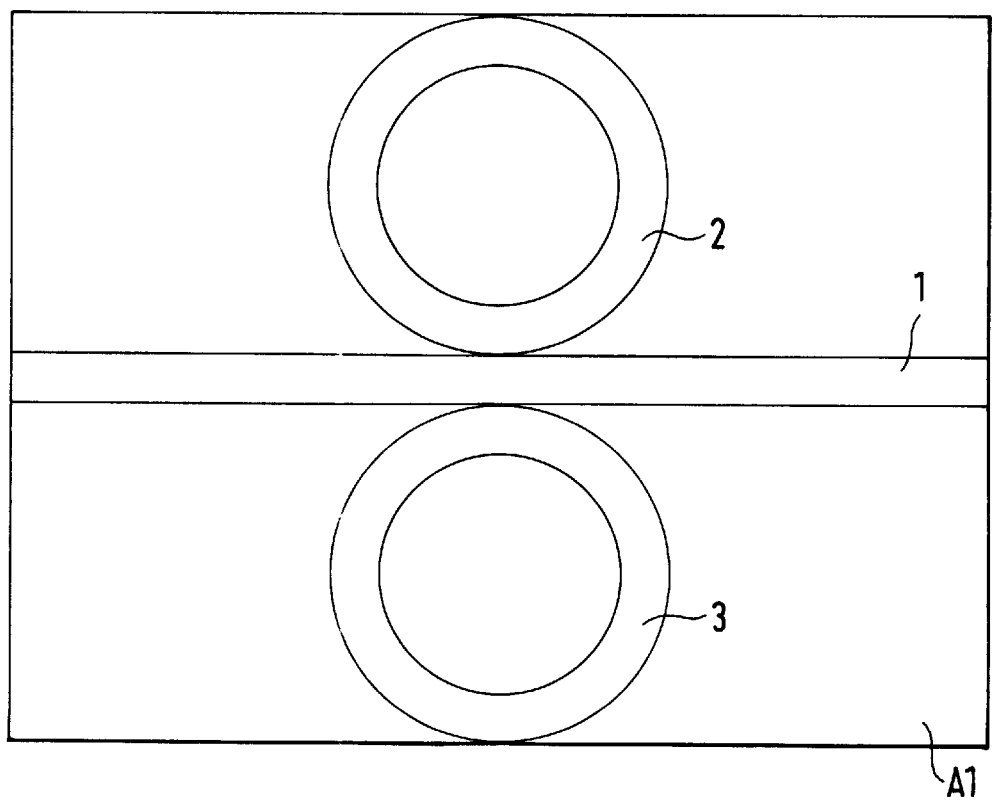

ELECTRIC STEERING-WHEEL HEATING ELEMENT

BACKGROUND OF THE INVENTION

1. Field of the Invention

The invention relates to an electric steering-wheel heating element to be mounted on a steering wheel rim.

2. Description of the Related Art

Steering wheels of motor vehicles are usually unheated. However, at low temperatures this leads to contact with the steering wheel being extremely unpleasant or even painful if gloves are not being worn.

In order to overcome this problem, DE-U-93 18 355 proposed very generally the installation of heating wires in the steering wheel, but no practically realisable way of manufacturing a steering-wheel heating system which could actually be used was indicated.

DE-C-33 39 500 discloses a steering-wheel heating system in which the steering wheel is wound with heating wires. In accordance with a steering-wheel heating system which is known from DE-A-36 43 398, heating wires are secured to the steering wheel with the aid of adhesive tape. However, these solutions entail high production costs and have in particular the disadvantage that the heating wires are very easily distinguished on an upper side of a steering wheel covering.

DE-U-86 12 133 discloses a steering wheel cover comprising heat-conducting plastic with integrated electric heating mesh. U.S. Pat. No. 5 294 775 discloses a steering wheel cover which comprises synthetic material or leather and contains in its interior a heating wire arranged in a meandering shape. With these steering wheel covers, the heating wires are clearly distinguishable on the upper side of the steering wheel covering.

Solutions known from DE-C-39 06 576 and DE-U-87 05 717 provide for heating elements to be foamed in or injection moulded onto a steering wheel core. However, these solutions are very tool-intensive and are an impediment to the rapid flow of a production process. Furthermore, in the steering-wheel heating system known from DE-C-39 06 576 the heating elements are not provided near to the surface. This leads to very long heating-up times for the upper side of the steering wheel, whereas the actual purpose of a steering-wheel system is to heat up the upper side of the steering wheel as rapidly as possible. DE-U-87 05 717 discloses an embodiment of a steering-wheel heating system which permits the upper side of the steering wheel to heat up rapidly but with this embodiment there is again the problem of the heating wires being distinguishable on the upper side of the steering wheel covering.

In order to eliminate the aforesaid disadvantages, it was proposed in EP-A-0 437 641 that, before the steering wheel covering is mounted, a mesh is attached, as heating inlay, to the steering wheel core, on an inner side of the steering wheel covering. However, this solution is not free of difficulties. Technological problems are experienced in particular with cutting in a precisely contoured fashion the mesh with its jagged cut edges made of individual wires or braided conductors, as well as sewing it in a precisely fitting fashion to the inner side of the steering wheel covering. Since the mesh has a relatively coarse structure, the problem of the heating wires being distinguishable on the upper side of the steering wheel covering is not completely eliminated either.

SUMMARY OF THE INVENTION

The object of the invention is to provide an electric, reliably acting steering-wheel heating element to be mounted on a steering wheel rim, which steering-wheel heating element is easy to mount and is not distinguishable on a steering wheel covering.

This object is achieved by means of a steering-wheel heating element to be mounted on a steering wheel rim, comprising

- a linear center region made of flat ribbon-shaped, electrically conductive material,
- a first side region made of flat ribbon-shaped, electrically conductive material, which region has at least one curved side segment, and
- a second side region made of flat ribbon-shaped, electrically conductive material which has at least one curved side segment, the shape of the center region and of the curved side segments being configured in such a way that after mounting
- the center region covers an external circumferential region of the steering wheel rim,
- the first side region alongside one longitudinal side of the center region covers one side circumferential region on one side of the steering wheel rim, and
- the second side region alongside the other longitudinal side of the center region covers a side circumferential region on the other side of the steering wheel rim.

The electric steering-wheel heating element according to the invention can be attached to a steering wheel rim without problems and can be more easily handled during mounting than for example a heating element which has to be attached to an inner side of a leather covering. There is also no tendency for the steering-wheel heating element to form folds in the region of inner bending radii, as is the case for example with a composite material comprising sleeve and heating system. The electric steering-wheel heating element according to the invention can be fastened to the rigid steering wheel rim, for example by means of a bonding process, and subsequently placed in contact with two thin metal braided conductors. A surface of a steering wheel rim with the heating system which has been prepared in this way is essentially smooth and can be provided with a covering according to known methods without any restrictions and completely free of problems. Heating-element structures are not distinguishable on the encased steering wheel rim.

Advantageoulsly the center region and the side segments form one part.

Preferably each side region has an essentially circular ring-shaped side segment.

In a preferred embodiment of the electric steering-wheel heating element of the present invention the center region is in one piece, each side region is formed by a plurality of curved side segments, and adjacent side segments of a side region are constructed in such a way that their ends overlap after mounting.

Conveniently a bonding agent is provided on one surface.

Preferably the free ends of the side segments which overlap after mounting are free of bonding agent.

The electrically conductive material of the electric steering-wheel heating element may be a metallized nonwoven, a metallized fabric, carbonised fabric or a fabric made of polypyrrol.

BRIEF DESCRIPTION OF THE DRAWINGS

Exemplary embodiments of the invention are explained in greater detail below with reference to drawings, in which:

FIG. 6 shows a production stage for the manufacture of the electric steering-wheel heating element in FIG. 1, and FIG. 7 shows a third embodiment of the electric steering-wheel heating element.

DETAILED DESCRIPTION OF THE PREFERRED EMBODIMENTS

Figure 1:
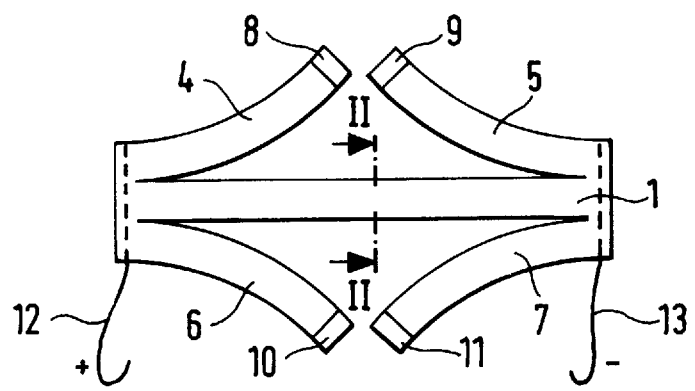
FIG. 1 shows a first embodiment of an electric steering-wheel heating element with electric connections.

The electric steering-wheel heating element shown in FIGS. 1 to 6 has an elongated, ribbon-shaped center section 1 which extends linearly. In the region of the two ends of the center section 1, on each longitudinal side of the center section 1, one flat curved side segment 4, 5, 6, 7 is connected in the longitudinal side region of one of its ends to the corresponding longitudinal side of the center region 1, with the result that the center region 1 and the side segments 4, 5, 6, 7 form one part.

The center section 1 and the side segments 4, 5, 6, 7 consist of a planar, essentially uniformly electrically conductive material, for example a metallised non-woven. However, the heating filaments can also be constructed as conductor tracks which meander repeatedly and densely on a flexible film.

The side segments 4, 5, 6, 7 are of identical curve-shaped construction and are connected at all four ends of the longitudinal sides of the center region 1 to the said center region 1 in such a way that, configured in one plane, their free ends forming overlapping regions 8, 9, 10, 11 are bent away from the center region 1, the overlapping regions 8, 9 and 10, 11 of the side segments 4, 5 and 6, 7 which are attached to one longitudinal side facing one another.

The shape of the steering-wheel heating element constitutes essentially a development of the external surface of a partial section of a steering wheel rim 20 (FIG. 5) in the region of the external circumference and of the lateral circumferential regions.

Figure 2:
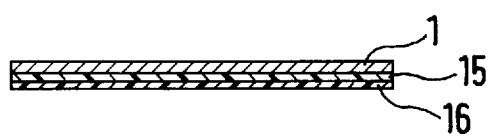
FIG. 2 shows the section II—II in FIG. 1.

The electric steering-wheel heating element is coated on one side almost completely with self-adhesive film 15 which is adhesive on both sides and is covered in the center section 1 and in the side segments 4, 5, 6, 7, separately from one another, with adhesive protective paper 16 (FIG. 2). Only the free end regions of the side segments 4, 5, 6, 7 which are provided as overlapping regions 8, 9, 10, 11 are not equipped, at least in each case on one side, with self-adhesive film 15, so as to ensure electrical contact on overlapping.

The electric steering-wheel heating element in FIG. 1 is manufactured by providing an essentially uniformly electrically conductive material over the complete surface, or partially, on one side with self-adhesive film 15 and adhesive protective paper 16 by means of known methods and then converting it (FIG. 6) to the shape shown in FIG. 1 by means of known punching and/or cutting methods.

Thin blank metallic braided conductors 12, 13 are used as electrical connections for the electric steering-wheel heating element according to the invention. These braided conductors 12, 13 are fastened, as illustrated in FIG. 1, to both longitudinal ends of the electric steering-wheel heating element by bonding between the flat ribbon-shaped, electrically conductive material and the self-adhesive film, by sewing onto the flat ribbon-shaped, electrically conductive material, by bonding onto the flat ribbon-shaped, electrically conductive material using conductive adhesive or by simply positioning the braided conductors and applying an external pressure, for example by means of an adhesive tape. The braided conductors 12, 13 run transversely to the longitudinal direction of the center region 1.

In order to fasten the steering-wheel heating element to the steering wheel rim 20 of a steering wheel, the adhesive protective film 16 is initially removed in the center region 1 and the center region 1 is bonded onto the external circumferential surface of the steering wheel rim 20 in the circumferential direction. Then, the adhesive protective film 16 is successively removed from the side segments 4, 5, 6, 7 and the side segments 4, 5, 6, 7 are bonded onto the steering wheel rim 20 in such a way that, with the exception of the one end at which they are connected to the center section 1, they are at a small distance from the center section 1, as shown by FIG. 5.

The punched sections are dimensioned in such a way that the side segments 4, 5 and 6, 7 which are bonded onto the side circumferential region of the steering wheel rim 20 overlap after being mounted on the steering wheel rim 20 in the overlapping regions 8 and 9 and 10 and 11 so that electrical contact is made here.

Figure 4:
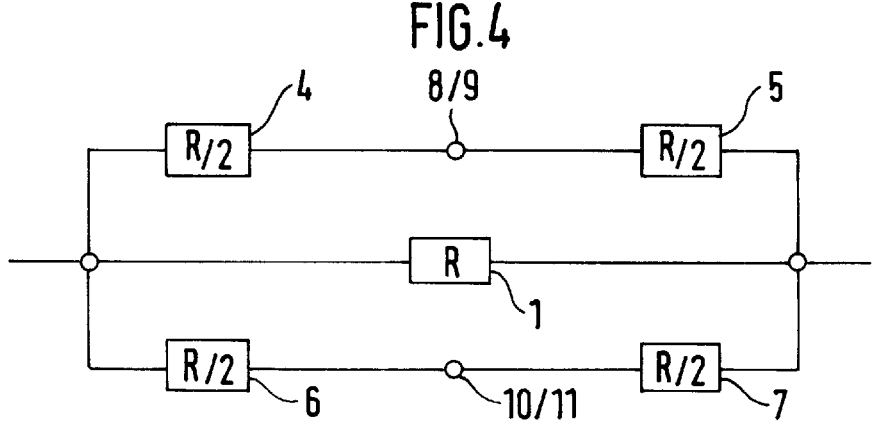
FIG. 4 shows a equivalent circuit diagram of the electric steering-wheel heating element in FIG. 1 in a state in which it is mounted on a steering wheel rim.

The electric steering-wheel heating element which is mounted in this way then forms an electrically parallel arrangement of three electric resistors which are of approximately the same size. An appropriate equivalent circuit diagram is shown in FIG. 4.

Figure 5:
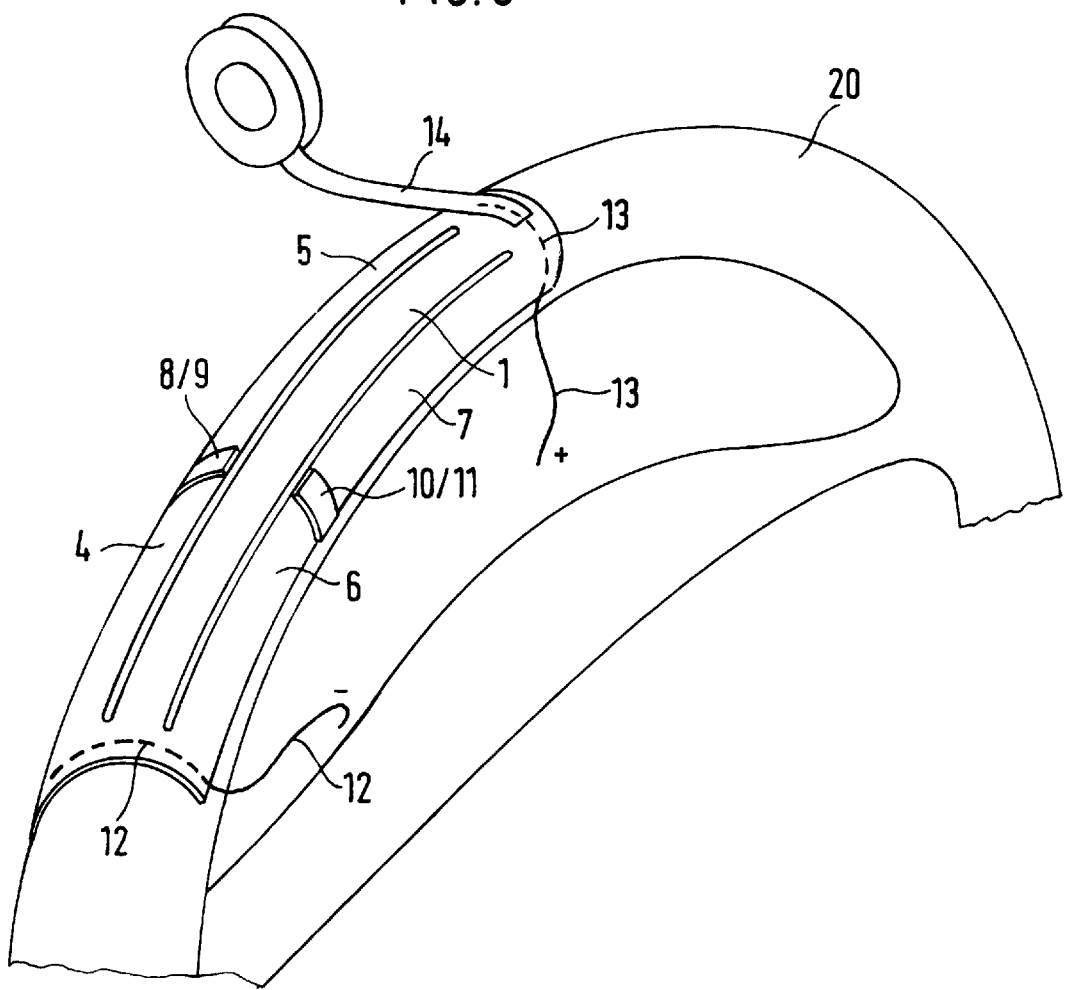
FIG. 5 shows the electric steering-wheel heating element in FIG. 1 in the state in which it is mounted on the steering wheel rim.

In order to obtain a contact pressure in a suitable fashion, an adhesive strip 14 is advantageously bonded on in the region of the braided contact conductors 12 and 13, as is shown in FIG. 5. By applying an adhesive strip 14, a contact pressure can also be produced between the overlapping regions 8, 9 and 10, 11. For connection to a voltage supply system, the braided contact conductors 12 and 13 are laid in a known manner on a rear or inner side of the steering wheel rim 20, for example in preformed slight depressions in the steering wheel rim.

It is also possible to manufacture the center region 1 and the side region parts 4, 5, 6, 7 initially completely separately from one another and only to assemble them during the process of mounting them on the steering wheel rim.

In order to provide the entire circumference of the steering wheel rim with electric steering-wheel heating elements according to FIG. 1, a plurality of identical electric steering-wheel heating elements are bonded onto the steering wheel rim 20 adjacently one next to the other, abutting one another directly.

Figure 3:
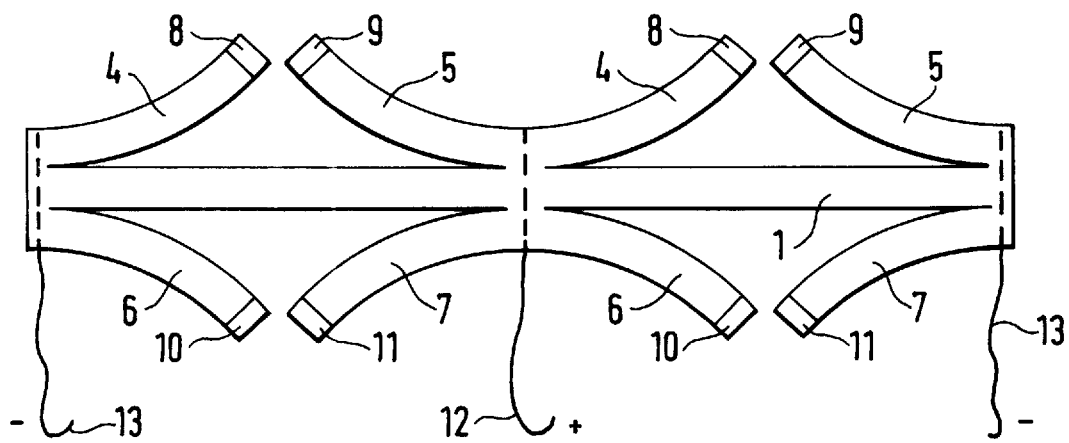
FIG. 3 shows a second embodiment of the steering-wheel heating element.

The electric steering-wheel heating element according to the invention can also be designed in such a way that the center region 1 has many times the length of the center region 1 of the steering-wheel heating element in FIG. 1 and a multiple of the number of side segments 4, 5, 6, 7 is connected to it, as shown in FIG. 3.

In the steering-wheel heating element shown in FIG. 7, the side segments 2, 3 are configured in one plane, in each case in a circular ring shape. Before mounting, they may form a coherent part with the center region 1 or be separated therefrom. After mounting, this electric steering-wheel heating element covers the entire circumference of the steering wheel rim.

A comparison of the material areas A1 and A2 illustrated in FIGS. 6 and 7 in terms of the blanks shows that, to manufacture the electric steering-wheel heating element shown in FIG. 7, a relatively high degree of material waste is necessary, and it is therefore better, as in the case of the electric steering-wheel heating element in FIG. 1, to define segments which can be mounted as strips in a row, either simultaneously in one piece or successively as a plurality of individual segments.

We claim:

1. An electric steering-wheel heating element to be mounted on a steering wheel rim, comprising
    a linear center element made of flat ribbon-shaped, electrically conductive material and having two longitudinal sides,
    at least two curved first adjacent side segments made of flat ribbon-shaped, electrically conductive material and each having at least one free end, and
    at least two curved adjacent second side segments made of flat ribbon-shaped, electrically conductive material and each having at least one free end,
    the shape of said center element and of said first and second curved side segments being configured in such a way that after mounting
    said center element covers an external circumferential region of said steering wheel rim,
    said first side segments alongside one of said two longitudinal sides of said center element cover a side circumferential region on one side of the steering wheel rim,
    said second side segments alongside an other of said two longitudinal sides of said center element cover a side circumferential region on an other side of the steering wheel rim,
    the free ends of adjacent first side segments overlap such that said adjacent first side segments are electrically connected and
    the free ends of adjacent second side segments overlap such that said adjacent second side segments are electrically connected.

2. The electric steering-wheel heating element according to claim 1, wherein said center element and the first and second side segments form one part.

3. The electric steering-wheel heating element according to claim 1, wherein a bonding agent is provided on a surface of said center element and said first and second side segments, the free ends of said first and second side segments which overlap after mounting being free of bonding agent.

4. The electric steering-wheel heating element according to claim 1, wherein said electrically conductive material is a metallized non-woven material.

5. The electric steering-wheel heating element according to claim 1, wherein said electrically conductive material is a metallized fabric.

6. The electric steering-wheel heating element according to claim 1, wherein said electrically conductive material is a carbonised fabric.

7. The electric steering-wheel heating element according to claim 1, characterized in that said electrically conductive material is a fabric made of polypyrrol.

* * * * *